US011163287B2

(12) United States Patent
Hackl et al.

(10) Patent No.: US 11,163,287 B2
(45) Date of Patent: Nov. 2, 2021

(54) CONTROL DEVICE FOR OPERATING A MACHINE TOOL, IN PARTICULAR A MILLING MACHINE OR LATHE, AND CORRESPONDING MACHINE TOOL

(71) Applicant: KEBA AG, Linz (AT)

(72) Inventors: Benjamin Hackl, Linz (AT); Philipp Wimmer, Desselbrunn (AT)

(73) Assignee: KEBA AG, Linz (AT)

( * ) Notice: Subject to any disclaimer, the term of this patent is extended or adjusted under 35 U.S.C. 154(b) by 169 days.

(21) Appl. No.: 16/332,927

(22) PCT Filed: Sep. 11, 2017

(86) PCT No.: PCT/AT2017/060225
§ 371 (c)(1),
(2) Date: Mar. 13, 2019

(87) PCT Pub. No.: WO2018/049450
PCT Pub. Date: Mar. 22, 2018

(65) Prior Publication Data
US 2019/0250581 A1 Aug. 15, 2019

(30) Foreign Application Priority Data
Sep. 14, 2016 (AT) .............................. A 50825/2016

(51) Int. Cl.
*G05B 19/4155* (2006.01)
*G05B 19/18* (2006.01)
(Continued)

(52) U.S. Cl.
CPC ......... *G05B 19/182* (2013.01); *B23Q 1/0045* (2013.01); *G05B 19/409* (2013.01);
(Continued)

(58) Field of Classification Search
CPC .............. G05B 19/182; G05B 19/4155; G05B 2219/37355
See application file for complete search history.

(56) References Cited

U.S. PATENT DOCUMENTS 4,464,614 A * 8/1984 Kurakake ............ G05B 19/416
318/39
4,510,427 A * 4/1985 Nozawa ................. G05B 19/40
318/590
(Continued)

FOREIGN PATENT DOCUMENTS

| DE | 195 04 663 A1 | 8/1995 |
| DE | 44 23 307 A1 | 1/1996 |

(Continued)

OTHER PUBLICATIONS

English translation of International Preliminary Report on Patentability in PCT/AT2017/060225, dated Aug. 27, 2018.
(Continued)

*Primary Examiner* — Gary Collins
(74) *Attorney, Agent, or Firm* — Collard & Roe, P.C.

(57) ABSTRACT

A control device for operating a machine tool having a motor-driven, traversable and positionable tool head. The control device executes a freely programmable control program and determines or co-determines the sequence of operations of the machine tool. The control device also comprises a user interface for influencing the sequence of operations of the machine tool by manual control, at least one operating element for manually controlling changes to movements of the tool head being formed on the user interface. A multi-functionally designed operating element is designed to manually preset or influence a feed rate during a machining phase of the tool head and which multi-functionally designed operating element, in a second usage mode, is designed to manually preset or influence a rapid- (Continued)

Figure 1:
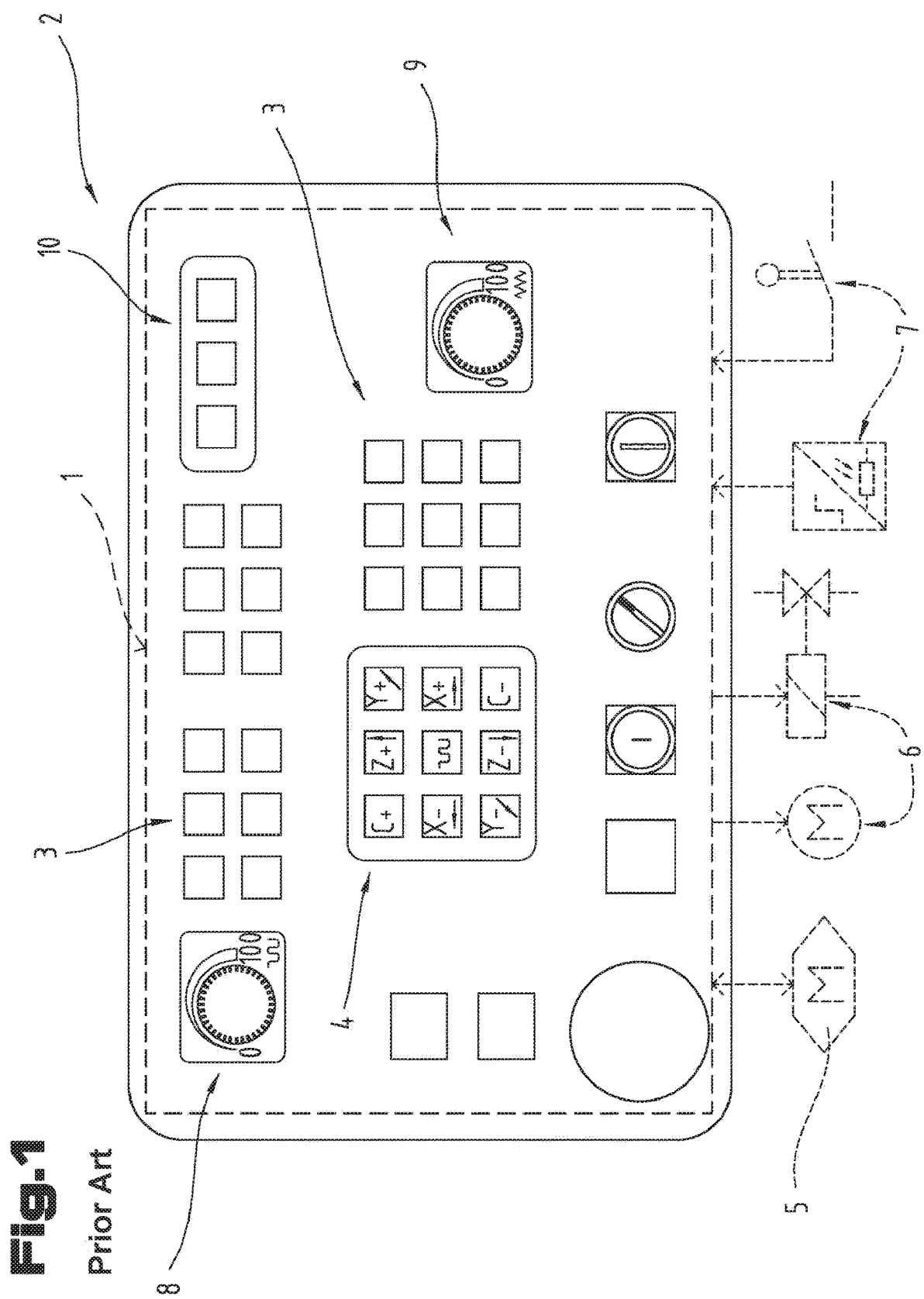

traverse rate during a rapid-traverse phase of the tool head. The multi-functionally designed operating element is designed as a rotary actuator operating element comprising a continuously rotatable actuating member.

14 Claims, 2 Drawing Sheets

(51) Int. Cl.
*G05B 19/416* (2006.01)
*G05B 19/409* (2006.01)
*B23Q 1/00* (2006.01)

(52) U.S. Cl.
CPC ..... *G05B 19/4155* (2013.01); *G05B 19/4166* (2013.01); *G05B 2219/23083* (2013.01); *G05B 2219/23208* (2013.01); *G05B 2219/37355* (2013.01); *G05B 2219/39264* (2013.01); *G05B 2219/43155* (2013.01); *G05B 2219/43186* (2013.01); *Y02P 90/02* (2015.11)

(56) References Cited

U.S. PATENT DOCUMENTS

| | | | |
|---|---|---|---|
| 5,453,674 A * | 9/1995 | Seki | G05B 19/4062 318/569 |
| 5,677,709 A | 10/1997 | Miura et al. | |
| 5,902,077 A * | 5/1999 | Halder | B23B 39/14 408/100 |
| 6,317,646 B1 | 11/2001 | De Caussin et al. | |
| 6,462,499 B2 | 10/2002 | Mukai | |
| 7,489,303 B1 * | 2/2009 | Pryor | B60K 35/00 345/173 |
| 8,036,770 B2 | 10/2011 | Ichikawa | |
| 8,473,091 B2 | 6/2013 | Nagano | |
| 2004/0032395 A1 * | 2/2004 | Goldenberg | G06F 3/0485 345/156 |
| 2008/0234855 A1 * | 9/2008 | Haas | G05B 19/409 700/180 |
| 2008/0249653 A1 | 10/2008 | Ichikawa | |
| 2009/0261990 A1 | 10/2009 | Wu et al. | |
| 2011/0208346 A1 | 8/2011 | Nagano | |
| 2017/0160722 A1 * | 6/2017 | Kawai | G05B 19/4069 |
| 2017/0300035 A1 * | 10/2017 | Kawai | G05B 19/4068 |
| 2019/0160686 A1 * | 5/2019 | Riedel | G06F 3/04883 |
| 2019/0232447 A1 * | 8/2019 | Tange | B23Q 3/155 |

FOREIGN PATENT DOCUMENTS

| | | |
|---|---|---|
| DE | 698 07 853 T2 | 8/2003 |
| DE | 601 26 855 T2 | 10/2007 |
| DE | 10 2008 001 011 A1 | 11/2008 |
| DE | 10 2014 200066 A1 | 7/2015 |
| EP | 1 403 619 B1 | 3/2004 |
| EP | 1 075 979 B1 | 10/2005 |
| EP | 2 360 541 A1 | 8/2011 |
| EP | 3 130 973 A1 | 2/2017 |
| JP | 2002-049413 A | 2/2002 |
| JP | 2007-152541 A | 6/2007 |

OTHER PUBLICATIONS

"Sinumerik—Sinumerik 840D sl / 828D—Bedienkomponenten udn Vernetzung", Siemens, May 4, 2016, pp. 517-520.

"Sinumerik—Sinumerik 840D sl / 828D—Erweiterungsfunktionen", Siemens, Sep. 26, 2011, pp. 259-263, 272-273, and 284-299.

International Search Report in PCT/AT2017/060225, dated Mar. 20, 2018.

Bedienerhandbuch—Fräsmaschine, Haas Automation Inc., Version A, Apr. 2015, (415 pages) HAAS_Auszug_german—mill—next-generation-control-operator's-manual—2015, with translation of relevant parts and English version of 2014 Mill Operator's Manual containing the passages of 2015 document in English language.

Eingreifen in die Bearbeitung, R & D Steuerungstechnik, Aug. 8, 2001, R&D_Auszug_BA_MTC4_Kap6_2001.pdf, (3 pages), with translation. This document shows discrete input elements for correcting feed-rate and rotation speed of a machine control from "R&D Steuerungstechnik".

* cited by examiner

CONTROL DEVICE FOR OPERATING A MACHINE TOOL, IN PARTICULAR A MILLING MACHINE OR LATHE, AND CORRESPONDING MACHINE TOOL

CROSS REFERENCE TO RELATED APPLICATIONS

This application is the National Stage of PCT/AT2017/060225 filed on Sep. 11, 2017, which claims priority under 35 U.S.C. § 119 of Austrian Application No. Sep. 14, 2016 filed on, the disclosure of which is incorporated by reference. The international application under PCT article 21(2) was not published in English.

The invention relates to a control apparatus for operation of a machine tool, in particular a milling machine or lathe, having a tool head that can be displaced and positioned by a motor, as well as to a machine tool having a corresponding control apparatus, as indicated in claims 1 and 14.

Machine tools, in particular milling machines and lathes, are known from the state of the art, which can be controlled fully automatically, partially automatically and/or manually by means of at least one electronic control apparatus, in terms of the movement sequences. In this regard, control panels are formed on the corresponding machines, which allow an operator to intervene in the control sequences or movement sequences of the machine tool. These control panels typically have a plurality of display and input elements, so as to be able to allow an operator to monitor the respective operational states and to undertake manual control technology interventions. Such control panels are provided, in particular, for monitoring and operation and/or programming. In accordance with a known embodiment, as it is also shown in FIG. 1, separate control elements or potentiometers are provided, wherein the advancing speed of the tool head can be manually set or adjusted using the first control element, and what is called rapid speed of the tool head can be manually set or adjusted using the second control element or potentiometer. The operational sequences that are available using such a control panel are only conditionally satisfactory.

It was the task of the present invention to overcome the disadvantages of the state of the art and to make available a control apparatus and a machine tool that allows improved operation of the machine tool for an operator.

This task is accomplished by means of a control apparatus and a machine tool in accordance with the claims.

The control apparatus or machine tool according to the invention offers the advantage that an operator can set the desired or practical movement speeds, in each instance, during the course of the processing phases and also during the course of the rapid-speed phases of an ongoing control or processing program (CNC) program. In this regard, the operator can leave his/her hand on the multi-functional control element, while on the one hand, movement speeds of the tool head during the course of processing phases and, on the other hand, movement speeds of the tool head during the course of rapid-speed phases can be set or manually determined. In particular, in this way a constant change in hand position by the operator between two control elements, as this is known from the state of the art, is eliminated.

This is achieved, in a manner according to the invention, by means of implementation of an infinitely rotatable rotary control element. Since such a rotary control element having an infinitely rotatable activation part does not have any fixedly predefined end stops, problem-free switching, in terms of control technology, between the first usage state (processing phase) and the second usage state (rapid-speed phase) of the rotary control element is made possible.

A particular effect of the measures according to the invention also lies in that the operator can direct his/her view or his/her focus—and ultimately his/her concentration—at the tool head, to an increased degree, and thereby more precise but also faster control actions can be achieved. Furthermore, in this way the potential risk with regard to damage to the machine, to the workpiece or to the tool can be prevented.

Aside from greater operational convenience for the operator, greater efficiency, faster operability and the most precise attainment possible of the desired settings or results is therefore achieved in this way.

If applicable, improved efficiency can also be achieved by means of the central or multi-functional control element. Among other things, the costs with regard to production, logistics, installation and the like can thereby be reduced. In this regard, in advantageous manner, such savings are not at the expense of functionality, but rather the operational ergonomics can actually be increased by the measures according to the claims. Ultimately, great user acceptance can also be achieved in connection with a control apparatus or machine tool implemented in accordance with the invention.

Measures according to claim 2 are also advantageous, since as a result, relatively reliable evaluation, in terms of control technology, of the control commands issued or initiated by way of the rotary control element is made possible. Furthermore, infinite rotatability or ability of the activation part to turn is made possible in this way.

The measures according to claim 3 are also advantageous. As a result, the possibility of sequential running of the control program, in particular of a CNC processing program exists, wherein either speed setting of the advancing speed or speed setting of the rapid speed acts on the production process with time offset. In particular, in this way a test run that can be carried out conveniently and rapidly is made possible with regard to an existing CNC processing program with a predefined movement path of the tool head.

By means of the measure according to claim 4, the method of operation of the control apparatus and the work method of the machine tool can be easily adapted to the respective needs or requirements.

A measure according to claim 5 and/or 6 is also advantageous, since in this way, good interaction between the operator and the control apparatus of the machine tool is made possible. In particular, existing CNC processing programs or control programs can be tested in particularly fast and convenient manner in this way, i.e. the respective control program or operational program can be evaluated by an operator in particularly fast and convenient manner in this way.

The measures according to claim 7 and/or 8 are also practical, since in this way, what is called a "hand-wheel mode" is made available, which allows precise positioning of the tool head by means of the rotary control element. The functionality or scope of function of the rotary control element can thereby be further increased, and thereby the efficiency of the corresponding control apparatus can also be improved. Furthermore, the corresponding activation action is particularly intuitive, since it is comparable with the movement of a screwdriver.

The measures according to claim 9 are also advantageous, since in this way, the user friendliness or operational ergonomics can be further increased. In particular, in this way the operator can be given haptic feedback with regard to the respective machine states or operational states. In this regard, this haptic feedback channel, proceeding from the control apparatus in the direction of the operator, promotes the most error-free and precise operation possible of a corresponding machine tool. This is true, among other things, because the controllability of the overall system can be improved by means of utilization of the tactile perception ability of an operator.

The measures according to claim 10 are also practical, since in this way, an operator receives a haptic signal that relatively high movement speeds are present or were initiated. Furthermore, in this way unconscious "over-steering" can be prevented. This is all the more practical, for example, if the movement direction of the tool head runs parallel or approximately parallel to the viewing direction of the operator, and if it is therefore comparatively difficult for an operator to recognize how great the currently existing movement speed of the tool head actually is.

The measures according to claim 11 are also practicable, since in this way the operator can receive a signal when maximal values or end ranges have been reached. The rotary control element can be used in multiple ways for a plurality of different machine functions, each having different limit values, by means of the controlled or controllable adaptability of the rotary control element with regard to these end stops. In this regard, the corresponding adaptation can advantageously take place in automated manner, by way of the control apparatus.

The user friendliness of the control apparatus can also be improved by means of the measures according to claim 12. In particular, in this way possible irritations of the operator due to intended movement sequences, which are ultimately, however, not carried out or cannot be carried out for technical reasons, can be prevented.

An embodiment according to claim 13 is also practical, since in this way, the tactile perception ability of an operator is utilized so as to be able to find or assume the respectively desired or required settings as quickly as possible and, at the same time, with avoidance of errors.

The task of the invention is also accomplished by a machine tool according to claim 14. The advantageous effects and technical effects that can be achieved in this way can be derived from the above description and from the following explanations.

For a better understanding of the invention, it will be explained in greater detail using the following figures.

Figure 2:
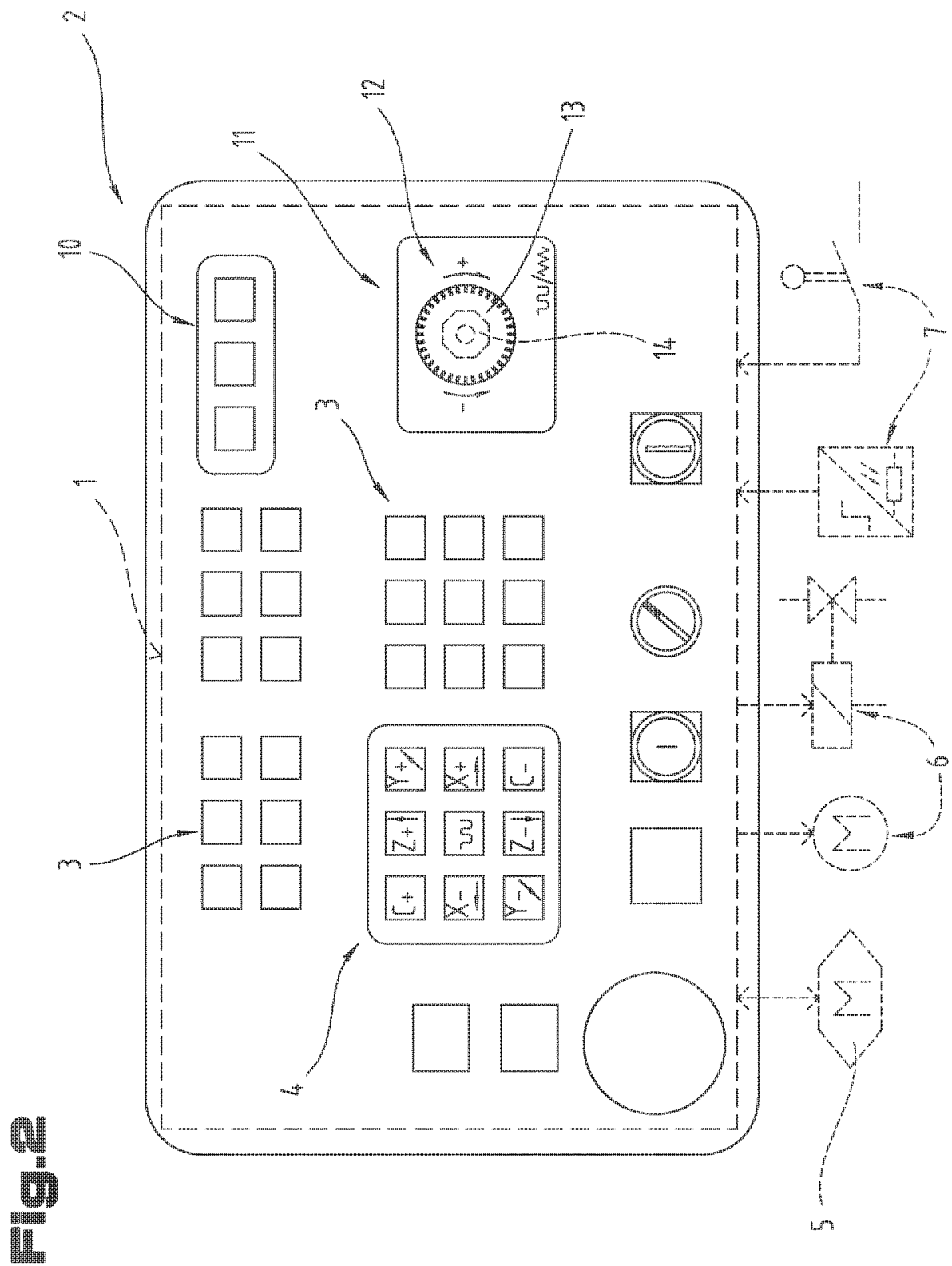

The figures show, in a greatly simplified, schematic and exemplary representation, in each instance:

FIG. 1 an operator interface of a machine tool according to the state of the art;

FIG. 2 an improved operator interface and control apparatus for a machine tool.

As an introduction, it should be stated that in the different embodiments described, the same parts are provided with the same reference symbols or the same component designations, wherein disclosures contained in the description as a whole can be applied analogously to the same parts having the same reference symbols or component designations. Also, the position information selected in the description, such as at the top, at the bottom, at the side, etc., for example, relates only to the figure being directly described and shown, and this position information must be applied analogously to a new position in the case of a change in position.

In FIG. 1, a control apparatus 1 or a user interface 2 of a machine tool according to the state of the art is shown. In this regard, the control apparatus 1 can be a component of the user interface 2 or of what is called a control panel of the machine tool. Alternatively, the control apparatus 1 can also be disposed locally at a distance with reference to the user interface 2. Furthermore, distributed placement of individual control apparatuses 1 is possible, as is known from many embodiments in the state of the art. In this regard, the respective control apparatuses 1 stand in a signal-technology or data-technology connection, typically a cable connection or bus connection, so as to allow the respective control sequences or operational sequences and control actions.

The corresponding user interface 2 of the machine tool, in particular of what is called a CNC machine, such as a milling machine or a lathe, for example, allows manually controllable influencing of the operational sequences of the machine tool. For this purpose, a plurality of switching elements 3, which can be structured as switching element keys or push buttons, can be provided.

For manually controllable movement or positioning of machine axes, in particular of a tool head 5 of the machine tool, a plurality of displacement keys 4 is generally provided.

The corresponding control apparatus 1 thereby allows controlled operation of the machine tool, in particular controlled displacement and positioning of the tool head 5 of the machine tool by means of a motor. As is known, a plurality of different actuators 6 and sensors 7 or transducers can be connected with the control apparatus 1, so as to be able to bring about automated or partially automated movement sequences or operational sequences of the machine tool.

Furthermore, varied embodiments of various safety or emergency shut-off elements, key switches, illuminated push buttons and the like can be provided on the user interface 2.

Known control apparatuses 1 or user interfaces 2 of machine tools comprise a first potentiometer 8 for manual adjustment or setting of the advancing speed of the tool head 5. In addition, a second potentiometer 9 is provided, which is intended for manual adjustment or setting of a rapid speed of the tool head 5. In this regard, the first and the second potentiometer 8, 9 have restricted angles of rotation. In particular, in the case of these potentiometers 8, 9, a minimal setting (0) and a maximal setting (100) is defined, in each instance.

To set the cutting speed, in particular the speed of rotation of the tool or of the workpiece, in particular for selection of the spindle speed of rotation, selection keys 10 can be accessed or activated on the user interface 2.

In the case of the control apparatus 1 or the user interface 2 according to the state of the art, manual setting of the advancing speed of the tool head 5 therefore takes place by way of the first potentiometer 8, and manual setting of the rapid speed of the tool head 5 takes place by way of the second potentiometer 9. In this regard, movement of the tool head 5 takes place either at the advancing speed—when the tool of the tool head 5 stands in engagement or could stand in engagement with the workpiece—or at the rapid speed, when the tool is not in engagement with the workpiece. In particular during idle travel of the tool head 5 or during reset movements and the like, rapid speed is present or rapid speed is available. This operational state of the machine tool can be referred to as a rapid-speed phase. The operation state in which the machine tool carried out processing of a workpiece by means of the tool head 5 can be referred to as a processing phase.

In other words, in the case of known control apparatuses 1, two structurally independent potentiometers 8, 9 are provided for setting advancing speed and rapid speed, which potentiometers are disposed at a distance from one another and must be selectively activated by an operator. In this regard, the advancing speed can be manually set or adjusted by way of the first potentiometer 8, while the rapid speed can be set or adjusted by way of the second potentiometer 9.

In the case of a method of procedure that is usual in practice, one proceeds, during the course of a test of a new CNC program or control program, in such a manner that during a processing step or during a processing phase, the second potentiometer 9 (rapid-speed potentiometer 9) is set to zero, relative to the workpiece, and during a rapid-speed movement or rapid-speed phase, the first potentiometer 8 (advancing potentiometer 8) is set to zero, while the other potentiometer 8 or 9, in each instance, is set to a desired value of the speed by the operator. In this regard, setting of the respective speed generally takes place with observation of the machine and of the cutting profile of the tool. In particular, the alternating speed settings take place under the control and supervision of an operator—partially based on the respective knowledge and experience of the operator.

Aside from this manual influence possibility of the operational sequences or movement sequences of the tool head 5, the control apparatus 1 also comprises a control program that is stored or can be stored in a memory apparatus of the control apparatus 1. In this regard, the control apparatus 1 is set up to run this at least partially freely programmable control program, and the operational sequences of the machine tool are determined or at least co-determined by this control program, among other things.

The known user interface 2 of a machine tool therefore has two potentiometers or control elements 8, 9 for a manually controllable change in the movement speeds of the tool head 5. Furthermore, at least one control element, for example a plurality of displacement keys 4, is provided for positioning of the tool head 5, in particular for a manually controllable change in movements or positions of the tool head 5.

The operational sequences that can be achieved with such a control apparatus 1 according to the state of the art are only conditionally satisfactory.

FIG. 2 shows an exemplary embodiment of a control apparatus 1 structured according to the invention or of a user interface 2 implemented according to the invention.

In this regard, the user interface 2 comprises a single control element 11, which is set up both to manually set the advancing speed of the tool head 5 and to manually set the rapid speed of the tool head 5. In particular, in this regard, a control element 11 configured in multi-functional manner is provided, which is set up, on the one hand—in a first usage state—to manually set or adjust an advancing speed during the course of a processing phase of the tool head 5, and, on the other hand—in a second usage state—to manually set or adjust a rapid speed during the course of a rapid-speed phase of the tool head 5. Accordingly, a multi-functional, common (central) control element 11 is provided, which is set up alternately to manually set the advancing speed during the course of a processing phase of the tool head 5, and to manually set the rapid speed during the course of a rapid-speed phase of the tool head 5. In this regard, the respective usage states of the central control element 11 are preferably set alternately or one after the other, in terms of time, and can be determined or co-determined by the control apparatus 1.

In this regard, the multi-functional, alternately usable control element 11 is configured as a potentiometer that does not have stops, but rather as a rotatable control element 11 that does not have stops. In particular, the multi-functionally structured control element 11 is configured as a rotary control element 12 having an infinitely rotatable activation part 13. As a result, change-overs between the first usage state and the second usage state—and vice versa—can be brought about without problems. These change-overs between the first and the second usage state of the rotary control element 12 are preferably initiated by the control apparatus 1 or automatically triggered by its control program. A separate operational action on the part of the operator for a change-over between the first and the second usage state of the control element 11, in particular of the rotary control element 12, is not required, above all during the presence of an evaluation mode of the control apparatus 1.

In accordance with a practical embodiment, the rotary control element 12 is structured as an incremental transducer, which is set up to issue pulses that can preferably be captured digitally. The control apparatus 1 can thereby reliably capture the angle of rotation through which the activation part 13 has passed and also its rotational speed, in each instance.

Preferably, a movement path to be performed by the tool head 5 is defined or can be defined as needed in the control program of the control apparatus 1. Such a movement path comprises processing phases and rapid-speed phases of the tool head 5 that follow one another in terms of time or sequentially. In order to guarantee a practicable operational sequence, it is provided that the control program comprises an evaluation mode that is set up to automatically stop the tool head 5 at the end of a processing phase of the tool head 5 and at the end of a rapid-speed phase of the tool head 5. After each stop, the processing phase or the rapid-speed phase can be easily initiated by the operator in that the activation part 13 is "turned up," so to speak, by the desired angle of rotation. Since the activation part 13 is infinitely rotatable, it is advantageously not necessary, in this regard, to first undertake a reset of the activation part 13. Every rest position can be used from then on as a starting position or initial position for initiation of a new movement at a newly defined movement speed of the tool head 5.

In this connection, the control program can be set up to set the speed value for the tool head 5 to zero at the end of the processing phase and at the end of the rapid-speed phase. It is practical, in this regard, if this evaluation mode can be selectively turned on and off by an operator.

The control program of the control apparatus 1 can also be set up to make manual operation available, which can be activated by an operator. In this manual operation, the rotary control element 12 is provided for positioning of the tool head 5. This means that in this regard, speed setting does not take place, but rather a position specification is implemented. As a result, the functionality or multi-functionality of the rotary control element 12 is further increased. During the course of such a position specification, movement of the tool head 5 only takes place as long as rotary activation of the rotary control element 12 is being carried out. Accordingly, the rotary control element 12 is set up, during the course of manual operation, to initiate a movement of the tool head 5 only as long as rotary activation of the activation part 13 of the rotary control element 12 is present.

It is practical if the rotary control element 12 or its activation part 13 is structured to have a stable position. Accordingly, it does not need to be held in the respective desired angle of rotation position by an operator. If the rotary control element 12 or its activation part 13 has therefore been brought into a specific angle of rotation position by an operator, such as 80%, for example, then it therefore remains in this position or angle of rotation position. In particular, it remains in it until renewed or subsequent rotary activation is carried out.

By means of the use of the indicated rotary control element 12, both the advancing speed and the rapid speed can be set or adjusted as needed using the same control element 11. In particular, the corresponding rotary control element 12 is set up to re-initiate a movement of the tool head 5 after it has come to a stop, in the case of every change-over between processing phase and rapid-speed phase of the tool head 5, and to redefine the speed of the tool head. For this purpose, the operator rotates the activation part 13 about the corresponding angle of rotation in the direction that brings about an increase in speed. For example, this can take place by means of a rotation to the right, which is illustrated by a plus arrow in FIG. 2.

In accordance with a practical embodiment, the activation part 13 of the rotary control element 12 can stand in mechanical interaction or movement coupling with a rotary resistance-generating means 14 which can be changed in controlled manner. In this regard, the rotary resistance-generating means 14 can be turned on by the control apparatus 1, so as to build up variable rotary resistance values or values that can be changed as a function of status, with regard to the activation part 13.

In accordance with a practical measure, it can be provided, in this regard, that the control apparatus 1 and the rotary resistance-generating means 14 increase the rotary resistance of the activation part 13 in connection with a manual specification of high movement speeds or speeds that become higher, proportionally or correspondingly. As a result, haptic signaling is made available to the operator, by means of which the operator can recognize whether the movement speed of the tool head 5 is relatively low or comparatively high.

The control apparatus 1 and the rotary resistance-generating means 14 can also be set up to suddenly increase the rotary resistance of the activation part 13 or to block the rotatability of the activation part 13 when a maximally possible or maximally permissible speed value of the tool head 5 has been reached. In this way, as well, the user friendliness of a machine tool that is equipped with the control apparatus 1 indicated can be increased.

According to a practicable embodiment, it can be provided that the control apparatus 1 and the rotary resistance-generating means 14 are set up to greatly increase the rotary resistance of the activation part 13 or to inhibit or block the rotatability of the activation part 13 when the tool head 5 has reached a mechanically defined end location or end position or one defined in terms of program technology. Such end locations or end positions can, of course, also be known to the control apparatus 1 by means of sensors 7; in particular, such machine states or operational states can be captured by sensors. As a result, incorrect operation or irritation of the operator can be prevented.

In accordance with a practical embodiment, the control apparatus 1 and the rotary resistance-generating means 14 can also be set up to briefly increase the rotary resistance of the activation part 13 when defined intermediate values, for example 25%, 50%, and 75% of a maximal value of the movement speed of the tool head 5 are reached, or to increase it in pulse-like manner, and thereby to signal this haptically to an operator. In this way, as well, the tactile perception ability of an operator is utilized so as to be able to carry out the corresponding operational procedures quickly and so as to avoid errors, i.e. precisely.

The exemplary embodiments show possible embodiment variants, wherein it should be noted at this point that the invention is not restricted to the specifically represented embodiment variants of the same, but rather various combinations of the individual embodiment variants with one another are also possible, and this variation possibility lies within the ability of a person skilled in the art of this technical field, on the basis of the teaching for technical action provided by the present invention.

The scope of protection is determined by the claims. However, the description and the drawings must be used to interpret the claims. Individual characteristics or combinations of characteristics from the different exemplary embodiments shown and described can represent independent inventive solutions on their own. The task on which the independent inventive solutions are based can be derived from the description.

For the sake of good order, it should be pointed out, in conclusion, that for a better understanding of the structure, some elements have been shown not to scale and/or larger and/or smaller.

REFERENCE SYMBOL LISTING

1 control apparatus
2 operator interface
3 switching element
4 displacement keys
5 tool head
6 actuator
7 sensor
8 first potentiometer
9 second potentiometer
10 selection keys
11 control element
12 rotary control element
13 activation part
14 rotary resistance-generating means

The invention claimed is:

1. A control apparatus for operation of a machine tool having a tool head that can be displaced and positioned by a motor, the control apparatus comprising:
   a user interface for manually controllable influencing of operational sequences of the machine tool; and
   a multi-functionally structured control element;
   wherein the control apparatus is set up to run an at least partially freely programmable control program, and determines or co-determines the operational sequences of the machine tool;
   wherein the user interface comprises at least one control element for manually controllable changing of movements of the tool head,
   wherein the multi-functionally structured control element is set up, in a first usage state, to manually set or influence an advancing speed during the course of a processing phase of the tool head;
   wherein the multi-functional control element is set up, in a second usage state, to manually set or influence a rapid speed during the course of a rapid-speed phase of the tool head;
   wherein the multi-functionally structured control element is structured as a rotary control element having an infinitely rotatable activation part;
   wherein a movement path to be performed by the tool head is defined in the control program;

wherein the movement path comprises processing phases and rapid-speed phases of the tool head, which follow one another in terms of time; and wherein change-overs between the first and the second usage state of the rotary control element are determined in the control program.

2. The control apparatus according to claim 1, wherein the rotary control element is structured as an incremental transducer set up to issue pulses.

3. The control apparatus according to claim 1, wherein the control program comprises an evaluation mode that is set up to automatically stop the tool head at the end of the processing phase and at the end of the rapid-speed phase.

4. The control apparatus according to claim 3, wherein the evaluation mode can be selectively turned on and off by an operator.

5. The control apparatus according to claim 3, wherein the control program is set up to set a speed value for the tool head to zero at the end of the processing phase and at the end of the rapid-speed phase.

6. The control apparatus according to claim 1, wherein the rotary control element is set up to re-initiate a movement of the tool head during every change-over between the processing phase and the rapid-speed phase—and vice versa—and to redefine a speed of the tool head.

7. The control apparatus according to claim 1, wherein the control program is set up to make manual operation that can be activated by an operator available, in which manual operation the rotary control element is provided for positioning of the tool head.

8. The control apparatus according to claim 7, wherein the rotary control element is set up, during the course of manual operation, to initiate a movement of the tool head only as long as rotary activation of the activation part of the rotary control element is present.

9. The control apparatus according to claim 1,
wherein the activation part stands in mechanical interaction with a rotary resistance-generating means that can be changed in controlled manner; and
wherein the rotary resistance-generating means can be turned on by the control apparatus.

10. The control apparatus according to claim 9, wherein the control apparatus and the rotary resistance-generating means are set up to increase the rotary resistance of the activation part in connection with a specification of high movement speeds or speeds that become higher.

11. The control apparatus according to claim 9, wherein the control apparatus and the rotary resistance-generating means are set up to suddenly increase the rotary resistance of the activation part or to block the rotatability of the activation part when a maximally possible or maximally permissible speed value of the tool head has been reached.

12. The control apparatus according to claim 9, wherein the control apparatus and the rotary resistance-generating means are set up to increase the rotary resistance of the activation part, or to inhibit or block the rotatability of the activation part when the tool head reaches a mechanically defined end location or end position or a location or position defined in terms of program technology.

13. The control apparatus according to claim 9, wherein the control apparatus and the rotary resistance-generating means are set up to briefly increase the rotary resistance of the activation part when defined intermediate values of the movement speed of the tool head are reached, or to increase the rotary resistance of the activation part in manner, and thereby to signal the increase haptically to an operator.

14. A machine tool comprising:
a motor; and
a tool head that can be displaced and positioned by the motor; and
the control apparatus according to claim 1.

* * * * *